(No Model.)

A. GRAYDON.
BALL CASTER.

No. 549,267.  Patented Nov. 5, 1895.

Witnesses
F. H. Hoemer.
G. L. Sullivan

Inventor,
Andrew Graydon,
By Joseph A. Minturn
Attorney.

UNITED STATES PATENT OFFICE.

ANDREW GRAYDON, OF INDIANAPOLIS, INDIANA.

BALL CASTER.

SPECIFICATION forming part of Letters Patent No. 549,267, dated November 5, 1895.

Application filed April 17, 1895. Serial No. 545,990. (No model.)

*To all whom it may concern:*

Be it known that I, ANDREW GRAYDON, a citizen of the United States, residing at Indianapolis, in the county of Marion and State of Indiana, have invented certain new and useful Improvements in Furniture-Casters; and I do hereby declare the following to be a full, clear, and exact description of the invention, such as will enable others skilled in the art to which it appertains to make and use the same.

My said invention consists in certain improvements in the details of construction of that class of furniture-casters embodying a spherical roller mounted in a two-part casing, whereby the parts thereof are very securely connected and in a comparatively inexpensive manner.

I accomplish the objects of the invention by the mechanism illustrated in the accompanying drawings, in which—

Figure 1:
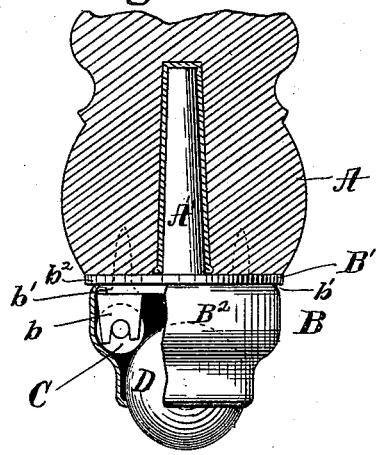
Figure 2:
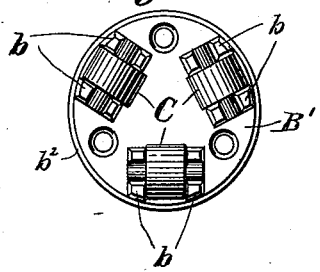

Figure 1 is a view in side elevation, partially in section, of my improved caster as applied to a table-leg; and Fig. 2 is an under side view of the top section of the two-part casing.

Similar letters of reference refer to like parts throughout both views of the drawings.

A represents a portion of the furniture to which the caster is secured, and B is the casing within which the rollers are mounted. A' is a stem integral with the top section of the casing for the purpose of fastening the caster to the furniture. This, however, is not an essential feature of the present invention, as the caster may be secured by means of screws, as shown by the dotted lines in Fig. 1, and the stem wholly dispensed with.

The casing B is divided horizontally into two parts B' and B². The upper part B' will preferably be of cast metal and will have the under-side bearings $b$, with notches in said bearings to receive the axles of the friction-rollers C. The bearings $b$ will be tapering, so the pattern can be drawn from the sand in molding and the necessity of hand-work in finishing ready for use wholly obviated. The outline of the disk-like portion B' may be circular, octagon, or any desired shape, but in all forms the periphery will be grooved, as shown at $b'$, and the portion $b^2$ above the groove will be projected outwardly to form an overhanging ledge.

The lower part B² of the casing will preferably be made from sheet-brass spun into a cup shape, such as is shown in the drawings. The bottom of this cup-shaped portion will be open.

D is a ball, preferably of steel or of aluminium-steel, of such diameter that a little less than half of the roller will project through the opening in the bottom of the part B², whereby the roller will contact with the floor, but will be held from passing through the part B² and dropping out of the casing.

C are rollers, preferably three in number, having their axles mounted in the bearings $b$. The load resting on the disk B' is transmitted through the rollers C to the spherical roller D.

In assembling the several parts of my caster the part B' is held in an inverted position—that is, with the bearings $b$ uppermost—and the rollers C placed in position. Then the roller D is placed upon the rollers C and then the cup-shaped part B² of the casing adjusted over all, with the edge of the cupped portion abutting against the ledge $b^2$, and the two parts then united by swaging the edge into the groove $b'$ in the manner as shown in Fig. 1. The ledge $b^2$ keeps the part B² from slipping too far onto the part B' and binding the roller D too firmly against the roller C. It also serves as a guide for the swaging-tool and forms a neat finish for the joint.

Having thus fully described my invention, what I claim as new, and wish to secure by Letters Patent of the United States, is—

In a furniture caster, the combination of a spherical roller mounted in a two part casing, said casing consisting of the disk B' provided with means for securing it to the furniture and formed with a circumferential groove or depression at its lower end, and a circumferential ledge just above said groove which projects out from the main body of said disk to overhang the groove or depression and serve as a guide for a swaging tool in securing the lower part of said casing thereto as well as an abutment for the upper end of said lower part, the small rollers C mounted in bearings on said disk between the spherical roller and the load, and the lower part of said casing consisting of the cup-shaped shell B² with its upper end abutting the under side of said overhanging ledge on said disk and its edge bent or swaged into said groove below said ledge, said lower part being formed of malleable metal to provide for said swaging, all substantially as set forth.

In testimony whereof I affix my signature in presence of two witnesses.

ANDREW GRAYDON.

Witnesses:
JOSEPH A. MINTURN,
G. L. SULLIVAN.